Figures 1, 2:
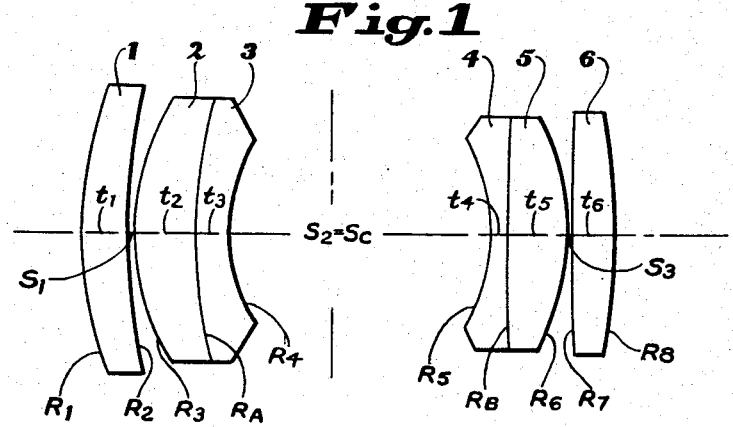

May 17, 1960     W. SCHADE     2,936,675
HIGH RESOLUTION PHOTOGRAPHIC OBJECTIVES
COVERING A MODERATE FIELD
Filed Jan. 30, 1959

| f = 100mm. | | | | f/3.5 |
|---|---|---|---|---|
| LENS | N | V | RADII | THICKNESSES |
| 1 | 1.745 | 4.58 | $R_1$ = +48.20mm. | $t_1$ = 6.4 mm. |
|  |  |  | $R_2$ = +89.40 | $S_1$ = 0.4 |
| 2 | 1.697 | 56.2 | $R_3$ = +31.25 | $t_2$ = 8.3 |
| 3 | 1.689 | 30.9 | $R_A$ = +63.98 | $t_3$ = 4.1 |
|  |  |  | $R_4$ = +21.48 | $S_2$ = 33.8 = $S_C$ |
| 4 | 1.673 | 3.23 | $R_5$ = -23.85 | $t_4$ = 2.1 |
| 5 | 1.745 | 45.8 | $R_B$ = +314.3 | $t_5$ = 8.2 |
|  |  |  | $R_6$ = -32.13 | $S_3$ = 0.1 |
| 6 | 1.745 | 45.8 | $R_7$ = +797.6 | $t_6$ = 5.2 |
|  |  |  | $R_8$ = -81.14 | L = 68.6 |

*Willy Schade*
INVENTOR.

BY *R. Frank Smith*
*Harold F. Bennett*
ATTORNEY & AGENT

United States Patent Office 2,936,675
Patented May 17, 1960

2,936,675

HIGH RESOLUTION PHOTOGRAPHIC OBJECTIVES COVERING A MODERATE FIELD

Willy Schade, Rochester, N.Y., assignor to Eastman Kodak Company, Rochester, N.Y., a corporation of New Jersey Application January 30, 1959, Serial No. 790,242

3 Claims. (Cl. 88—57)

This invention relates to photographic objectives of the type traditionally known as the Gauss type and designated as an M-type objective in a systematic classification of lens types published in the Journal of the Optical Society of America, May 1946. In this specification and the appended claims the designation "M-type" will be used.

The object of the present invention is to provide an M-type photographic objective highly corrected for the ordinary aberrations and oblique spherical aberrations and higher orders of coma when made up in apertures of about $f/4$ to $f/3$ and when used to cover a field of about 10° from the axis whereby pictures of medium-to-low-contrast can be produced with a high degree of recognizable detail or "acutance." The present invention constitutes a modification of my invention set forth in a co-pending application, Ser. No. 776,901, filed November 28, 1958, whereby the objectives described therein are adapted to cover a somewhat narrower angular field with an even higher acutance.

The M-type objective is defined as an objective comprising four axially aligned and air-spaced components of which the outer two are positive and the inner two are meniscus-shaped negative components arranged with their concave surfaces facing one another and separated by an airspace designated as the central airspace.

The present invention relates to M-type objectives in which the positive components are single positive elements and are shaped with their more strongly curved surfaces turned to the outside and in which the negative components are compound for correcting axial and lateral color. Conveniently the negative components are cemented doublets, although components including small airspaces are considered within the scope of the invention.

According to the invention an M-type photographic objective as defined above is made up in which the radii of curvature $R_1$ to $R_8$ of the external surfaces of the respective components the central airspace $s_c$ and the over all length L are within the limits defined by the following algebraic inequalities:

$$0.44\ f < +R_1 < 0.53\ f$$
$$0.77\ f < +R_2 < 1.10\ f$$
$$0.29\ f < +R_3 < 0.32\ f$$
$$0.21\ f < +R_4 < 0.24\ f$$
$$0.22\ f < -R_5 < 0.27\ f$$
$$0.31\ f < -R_6 < 0.35\ f$$
$$1.3\ f < +R_7 < \infty$$
$$0.70\ f < -R_8 < 1.00\ f$$
$$0.26\ f < S_c < 0.42\ f$$
$$0.6\ f < L < 0.8\ f$$

where the radii R are numbered by subscript in order from front to rear, where $f$ is the equivalent focal length of the objective and where the + and − signs associated with the radii R indicate surfaces respectively convex and concave toward the front, i.e., toward the longer conjugate distance.

In comparison with the objective shown in my earlier filed application, the radius $R_3$ is weaker, the concave radii $R_4$ and $R_5$ are more nearly equal to each other and preferably $R_5$ is numerically greater than $R_4$ by between 0.01 $f$ and 0.03 $f$. Also I find it beneficial to shift a little power from $R_6$ to $R_7$ making $R_7$ a convex rather than a concave surface. All these changes are useful in producing a higher degree of resolution over a smaller angular field.

The radii of curvature of the internal surface of the compound components are determined by the refractive indices of the glasses used and the requirements for the correction of axial and lateral color in a manner too well known to require detailed explanation here. These components are conveniently made up as cemented doublets, and by a judicial choice of glasses the radii of the cemented surfaces can be made larger than 0.5 $f$ for economy in production.

A preferred embodiment of the invention will be described with reference to the accompanying sheet of drawing in which:

Fig. 1 is a diagrammatic axial section of an objective according to the invention and, Fig. 2 is a table of constructional specifications for a preferred embodiment thereof.

The table given in Fig. 2 is repeated as follows:

$f = 100$ mm.     $f/3.5$

| Lens | N | V | Radii, mm. | Thicknesses, mm. |
|---|---|---|---|---|
| 1 | 1.745 | 45.8 | $R_1 = +48.20$ | $t_1 = 6.4$ |
|   |       |      | $R_2 = +89.40$ | $s_1 = 0.4$ |
|   |       |      | $R_3 = +31.25$ |             |
| 2 | 1.697 | 56.2 |                | $t_2 = 8.3$ |
|   |       |      | $R_A = +63.98$ |             |
| 3 | 1.689 | 30.9 |                | $t_3 = 4.1$ |
|   |       |      | $R_4 = +21.48$ |             |
|   |       |      |                | $s_2 = 33.8 = s_c$ |
|   |       |      | $R_5 = -23.85$ |             |
| 4 | 1.673 | 32.3 |                | $t_4 = 2.1$ |
|   |       |      | $R_B = -314.3$ |             |
| 5 | 1.745 | 45.8 |                | $t_5 = 8.2$ |
|   |       |      | $R_6 = -32.13$ |             |
|   |       |      |                | $s_3 = 0.1$ |
|   |       |      | $R_7 = +797.6$ |             |
| 6 | 1.745 | 45.8 |                | $t_6 = 5.2$ |
|   |       |      | $R_8 = -81.14$ |             |
|   |       |      |                | $L = 68.6$ |

In this table as in Figure 2, the lens elements are numbered in the first column in order from front to rear, the second and third columns give the refractive index N, for the sodium D line of the spectrum and the conventional dispersive indices V for each element and the third and fourth columns give the radii of curvature R of the lens surfaces, the thickness $t$ of the lens elements and the spaces $s$ between the components. The external surfaces of the components are numbered by subscript in order from front to rear, as are the thicknesses $t$ and the spaces $s$. The internal surfaces in the second and third components are designated as $R_A$ and $R_B$. The central airspace $s_c$ is the second airspace in this example. The length L equals the sum of all the thicknesses and airspaces and is also given in the last column. The + and − values of the radii denote surfaces respectively convex and concave to the front.

It is directly evident from this table that the illustrative example embodies all the features of the invention as described above and as set forth in the appended claims.

Having described my invention and a preferred embodiment thereof, it is pointed out that the invention is not restricted to the example shown but is of the scope defined by the appended claims.

I claim:

1. A photographic objective highly corrected for color and monochromatic aberrations for use at apertures greater than $f/4$ and adapted to cover a field of approximately $\pm 10°$ comprising 4 lens components in axial alignment, the first and fourth as numbered from front to rear being simple positive elements with their more strongly curved surfaces turned to the outside and the second and third being compound negative meniscus components concave toward a central space therebetween, in which the radii of curvature $R_1$ to $R_8$ of the external surfaces of the respective components numbered in order from front to rear and the central space $s_c$ and the overall length L are within the limits set forth in the following algebraic inequalities:

$$0.44 f < +R_1 < 0.53 f$$
$$0.77 f < +R_2 < 1.10 f$$
$$0.29 f < +R_3 < 0.32 f$$
$$0.21 f < +R_4 < 0.24 f$$
$$0.22 f < -R_5 < 0.27 f$$
$$0.31 f < -R_6 < 0.35 f$$
$$1.3 f < +R_7 < \infty$$
$$0.70 f < -R_8 < 1.00 f$$
$$0.26 f < s_c < 0.42 f$$
$$0.6 f < L < 0.8 f$$

where $f$ is the focal length of the objective and where the $+$ and $-$ signs associated with the radii R denote surfaces respectively convex and concave toward the front.

2. An objective according to claim 1 in which $R_5$ is numerically greater than $R_4$ by between $0.01 f$ and $0.03 f$.

3. A photographic objective comprising two simple components and two cemented doublet components axially aligned therebetween and made substantially according to the following specifications:

| Lens | N | V | Radii | Thicknesses |
|---|---|---|---|---|
| 1 | 1.74 | 46 | $R_1=+0.48f$ | $t_1=.06f$ |
|   |      |    | $R_2=+0.89f$ | $s_1<.01f$ |
| 2 | 1.70 | 56 | $R_3=+0.31f$ | $t_2=.08f$ |
|   |      |    | $R_A=+0.6f$  |            |
| 3 | 1.69 | 31 | $R_4=+0.21f$ | $t_3=.04f$ |
|   |      |    | $R_5=-0.24f$ | $s_2=.34f$ |
| 4 | 1.67 | 32 | $R_B=+3f$    | $t_4=.02f$ |
| 5 | 1.74 | 46 | $R_6=-0.32f$ | $t_5=.08f$ |
|   |      |    | $R_7=+8f$    | $s_3<.01$  |
| 6 | 1.74 | 46 | $R_8=-0.81f$ | $t_6=.05f$ | where the lens elements are numbered from front to rear in the first column and the corresponding refractive indices N for the D wavelength and the conventional dispersive index V are given in the second and third columns, where the radii of curvature $R_1$ to $R_8$ of the external surfaces of the respective components and the radii of curvature $R_A$ and $R_B$ of the cemented surfaces within the respective compound components are given in the fourth column, all arranged in order from the front to the rear of the objective, $+$ and $-$ values denoting surfaces respectively convex and concave to the front, where the axial thickness $t$ of the lens elements and the spaces $s$ between the components, each numbered by subscript from front to rear, are given in the last column, and where $f$ is the equivalent focal length of the objective as a whole.

References Cited in the file of this patent

UNITED STATES PATENTS

| | | |
|---|---|---|
| 2,389,016 | Wynne | Nov. 13, 1945 |
| 2,391,209 | Warmisham | Dec. 18, 1945 |
| 2,401,324 | Altman | June 4, 1946 |
| 2,475,938 | Altman | July 12, 1949 |
| 2,532,751 | Baker | Dec. 5, 1950 |